United States Patent Office 2,902,257
Patented Sept. 1, 1959

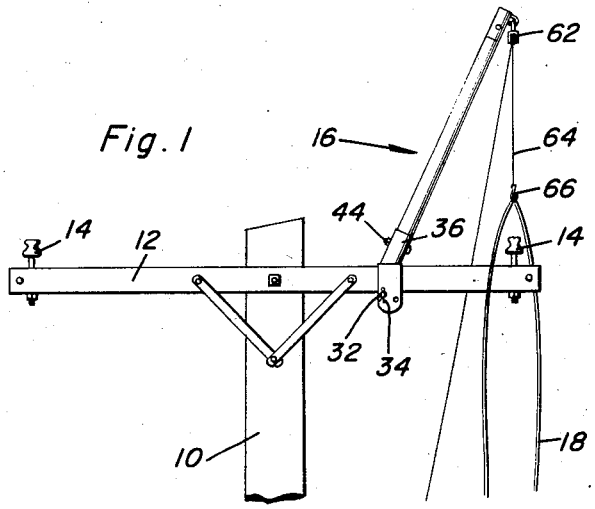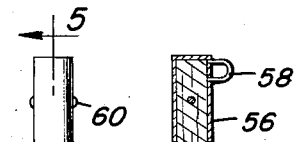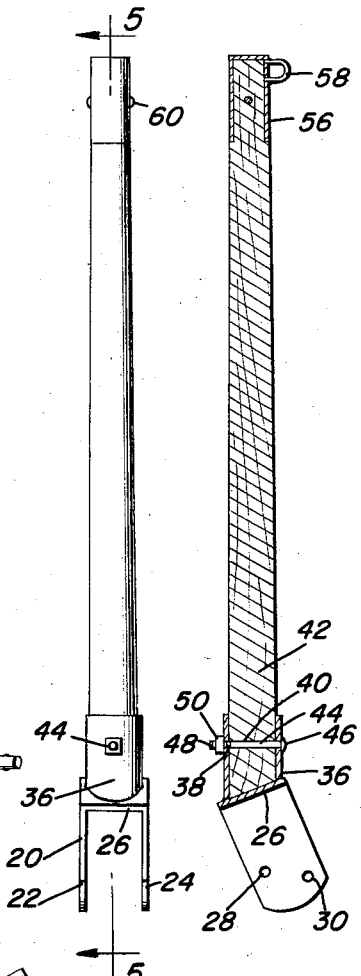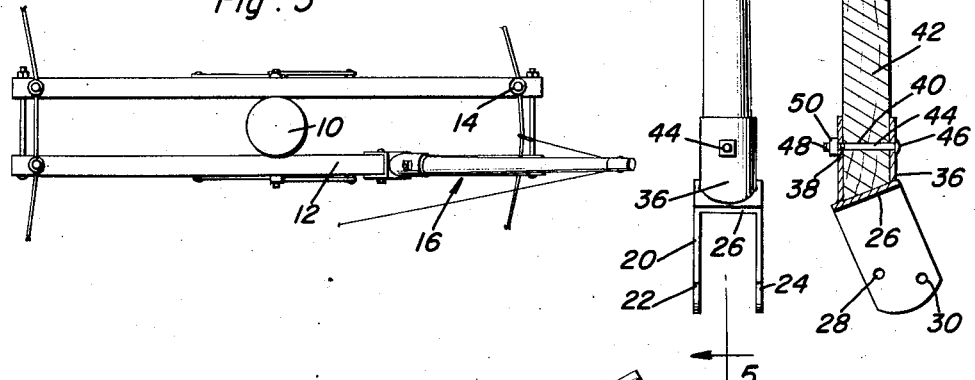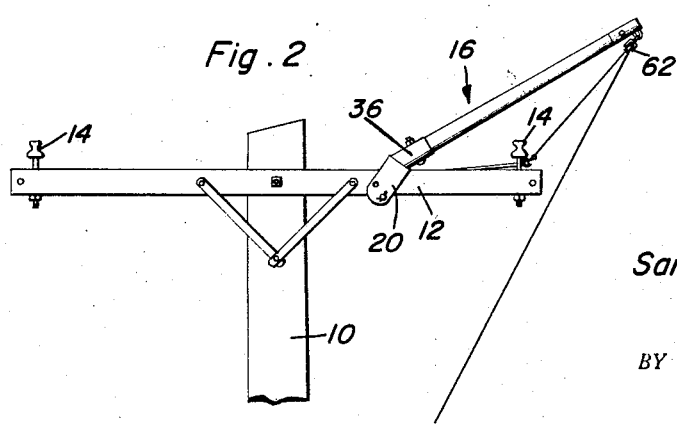
Samuel M. Young
INVENTOR.

2,902,257

TOOL FOR USE IN INSTALLING POWER LINES

Samuel M. Young, McCamey, Tex.

Application April 23, 1957, Serial No. 654,496

2 Claims. (Cl. 254—134.3)

This invention relates to a tool for use in installing power lines and more particularly to a novel cable gin adapted to be used in the construction of power lines employing cross-arm type of fixtures.

The primary object of the present invention resides in the provision of a tool for facilitating the installation of power lines.

The concept of this invention resides in the provision of a tool adapted to be detachably positioned on the cross-arm of a power line pole so arranged as to provide tackle for use in enabling the comparatively heavy cable to be easily handled on the insulator fixed to the cross-arm.

A tool of the character described that is simple in construction, inexpensive to manufacture, and which is easy to utilize thereby permitting extensive use in the construction and installation of power lines.

These, together with the various ancillary objects and features of the invention will become apparent as the following description proceeds, are obtained by this tool for use in installing power lines, a preferred embodiment being illustrated in the accompanying drawings by way of example only, wherein:

Figure 1 is an elevational view illustrating the tool in use;

Figure 2 is an elevational view illustrating the tool in an alternative position for use in removing a conductor cable from under an insulator and for enabling the cable to be correctly positioned on the insulator on an angle fixture;

Figure 3 is a top plan view of the assembly shown in Figure 2;

Figure 4 is an enlarged elevational view of the tool; and

Figure 5 is an enlarged sectional detail view as taken along the plane of line 5—5 of Figure 4 illustrating in particular the manner of securement of the pole to the socket.

With continuing reference to the accompanying drawings wherein like reference numerals designate similar parts throughout the various views, reference numeral 10 generally designates a power line pole having a cross-arm 12 carrying insulators 14 for supporting cables.

Adjustably secured to the cross-beam 12 is the gin or tool comprising the present invention and indicated at 16 which is adapted to be utilized in conjunction with the cross beam 12 to aid in erecting and installing power lines by serving as means for aiding in the placing of cables 18 on the insulators 14. Tool 16 includes a saddle 20 of generally inverted U-shape having flat legs 22 and 24 interconnected by a flat bight portion or cross member 26. The lower ends of the legs 22 and 24 are provided with horizontally spaced vertically staggered apertures arranged in pairs as at 28 and 30 extending through the legs 22 and 24 and adapted to receive a pin 32 therethrough which pin being provided with a head on one side and a cotter key 34 to hold the pin in place.

Welded to the cross member 26 is a sleeve providing a tubular socket member 36 which extends at an obtuse angle with respect to the axis of the legs of the saddle 20 and which is provided with holes 38 aligned with a bore 40 in the pole 42 received in the socket.

Extending through the aligned holes 38 and bore or passage 40 is a bolt or pin 44 having a head 46 and having a threaded end portion 48 on which a nut 50 is secured for detachably holding the pole 42 in the socket 36.

The free end of the pole 42 is received in a cap member 56 having an eye welded or otherwise affixed on one side as at 58. A bolt or rivet 60 holds the cap member on the pole 42. Carried by the eye 58 is a pulley 62 and the pulley 62 has a line 64 having a hook 66 entrained thereabout. The line 64, pulley 62 and hook 66 form tackle for engaging and supporting the cable 18. In use, the device may be utilized to support the cable 18 while it is placed on the insulator 14 in the groove therein. It is to be noted that in this arrangement the pin 32 extends through the aligned apertures 28.

However, in some instances the cable may be lying in the cross-arm beneath the insulator and in order to remove the cable and properly position it it is necessary to remove the pin 32 and place the pin in the aligned apertures 30 which will allow the pole to be moved to a position as is shown in Figure 2 whereby the tackle may be utilized to lift the cable from out beneath the insulator and raise the cable so that it may be guided back into the groove in the insulator 14, for receiving the cable.

It should be noted that the saddle and socket member constitute a novel simplified unit. The saddle is an inverted U-shaped member made of flat strap metal bent upon itself between its ends. Therefore, when the mitered lower end of the sleeve 36 is welded or otherwise joined atop the top surface of the bight portion 26 the axis of the then existing socket member and legs of the saddle is at the desired oblique angle. Not only this, it is to be noted that it is the bight portion 26 spanning the open bottom of the sleeve 36 which permits these components, collectively construed, to define a simple socket member.

It is further noted that the cap 56 has the eye 58 on one side thereof below what may be called the closed upper end of the cap.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for use in handling and installing power lines comprising an inverted U-shaped saddle including a flat bight portion and two depending flat legs providing a pole cross-arm accommodating pocket therebetween, a socket member mounted directly atop the upper surface of said bight portion and disposed at an obtuse angle to said saddle, an elongated pole having one end seated in said socket member, said pole and said socket member having aligned bores therethrough, a pin removably extended through said aligned bores detachably securing said pole in said socket member, said pole having a cap detachably fastened to the free end thereof, an eye secured to one side of said cap, a pulley secured to said eye, a support line entrained about said pulley, the lower ends of the legs of said saddle having aligned pairs of horizontally spaced vertically offset apertures therein, a holding pin in one of said pairs of apertures for engaging said saddle on a cross-arm in one of a plurality of preselected positions thereto.

2. For use in handling and installing power lines and assisting in connecting the same with insulators on the cross-arm atop a pole; a readily applicable and removable tool comprising an inverted U-shaped saddle constructed of flat strap metal bent upon itself between its ends to provide a bight portion and a pair of legs, said bight portion adapted to rest atop the aforementioned cross-arm and the legs adapted to straddle the vertical sides of the cross-arm and to extend below the bottom of the cross-arm, the lower ends of said legs having aligned pairs of staggered selectively usable bolt holes to accommodate an insertable and removable assembling and retaining bolt, a rigid metal tube having one end mitered, said mitered end being fixed atop the upper side of said bight portion and cooperating with said bight portion in defining a socket member, said socket member being disposed with its axis at an angle to the plane of said bight portion, said tube having bolt holes, a mast of predetermined length having one end fitted telescopically and removably into said socket member and provided with a bolt hole, the respective bolt holes being in alignment with each other, a bolt passing removably through said holes, and a cap detachably fastened to the upper end of said mast and provided on one side with an outstanding rigid eye which is adapted to accommodate a block or pulley.

References Cited in the file of this patent

UNITED STATES PATENTS

| | | |
|---|---|---|
| 2,188,715 | Ingram | Jan. 30, 1940 |
| 2,213,604 | Lennert | Sept. 3, 1940 |
| 2,625,371 | Dunn | Jan. 13, 1953 |